United States Patent
Albou

(10) Patent No.: US 7,578,608 B2
(45) Date of Patent: Aug. 25, 2009

(54) COMPACT HEADLIGHT FOR A MOTOR VEHICLE

(75) Inventor: Pierre Albou, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/376,032

(22) Filed: Mar. 14, 2006

(65) Prior Publication Data

US 2006/0209553 A1 Sep. 21, 2006

(30) Foreign Application Priority Data

Mar. 15, 2005 (FR) .................................. 05 02549

(51) Int. Cl.
*F21V 1/00* (2006.01)

(52) U.S. Cl. ................ 362/509; 362/475; 362/520; 362/476; 362/326

(58) Field of Classification Search ................. 362/509, 362/475, 520, 326, 362, 521, 522, 538, 507, 362/546, 548, 332, 333, 334, 335, 336, 338
See application file for complete search history.

(56) References Cited

U.S. PATENT DOCUMENTS

| | | | | |
|---|---|---|---|---|
| 2,254,961 A | | 9/1941 | Harris | |
| 4,827,367 A | * | 5/1989 | Luciani | 362/516 |
| 5,730,519 A | * | 3/1998 | Okuchi et al. | 362/559 |
| 6,431,736 B1 | * | 8/2002 | Saladin | 362/516 |
| 7,152,985 B2 | * | 12/2006 | Benitez et al. | 359/857 |
| 7,204,627 B2 | * | 4/2007 | Ishida | 362/509 |
| 7,364,332 B2 | * | 4/2008 | Komatsu et al. | 362/522 |
| 2005/0057940 A1 | * | 3/2005 | Capello et al. | 362/507 |
| 2005/0190572 A1 | * | 9/2005 | Komatsu et al. | 362/538 |

FOREIGN PATENT DOCUMENTS

DE 103 12 364 1/2005
FR 2 602 305 2/1988

OTHER PUBLICATIONS

Dialog English Abstract for FR 2 602 305.
Dialog English Abstract for DE 103 12 364.

* cited by examiner

*Primary Examiner*—Ali Alavi
*Assistant Examiner*—Evan Dzierzynski
(74) *Attorney, Agent, or Firm*—Locke Lord Bissell & Liddell, LLP

(57) ABSTRACT

A compact headlight for a motor vehicle having a light source with a substantially horizontal axis extending substantially perpendicular to the optical axis of the headlight. The headlight does not have a reflector and includes a lens which receives the light rays emitted from the light source and produces a light beam with cut-off. According to one embodiment, the light source and the lens are formed in a single unit wherein the light source is formed from one or more light emitting diodes and the lens is formed from a heat-resistant synthetic material which is molded onto at least one luminous surface of the source.

17 Claims, 4 Drawing Sheets

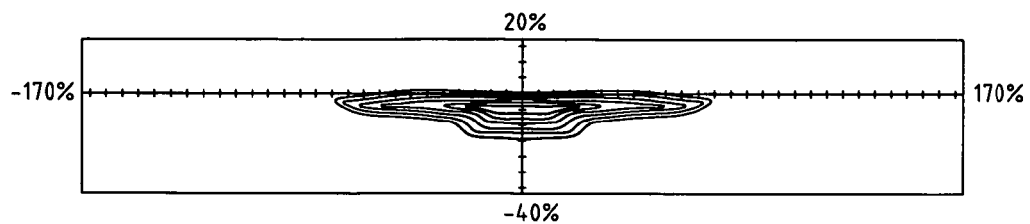
FIG.8
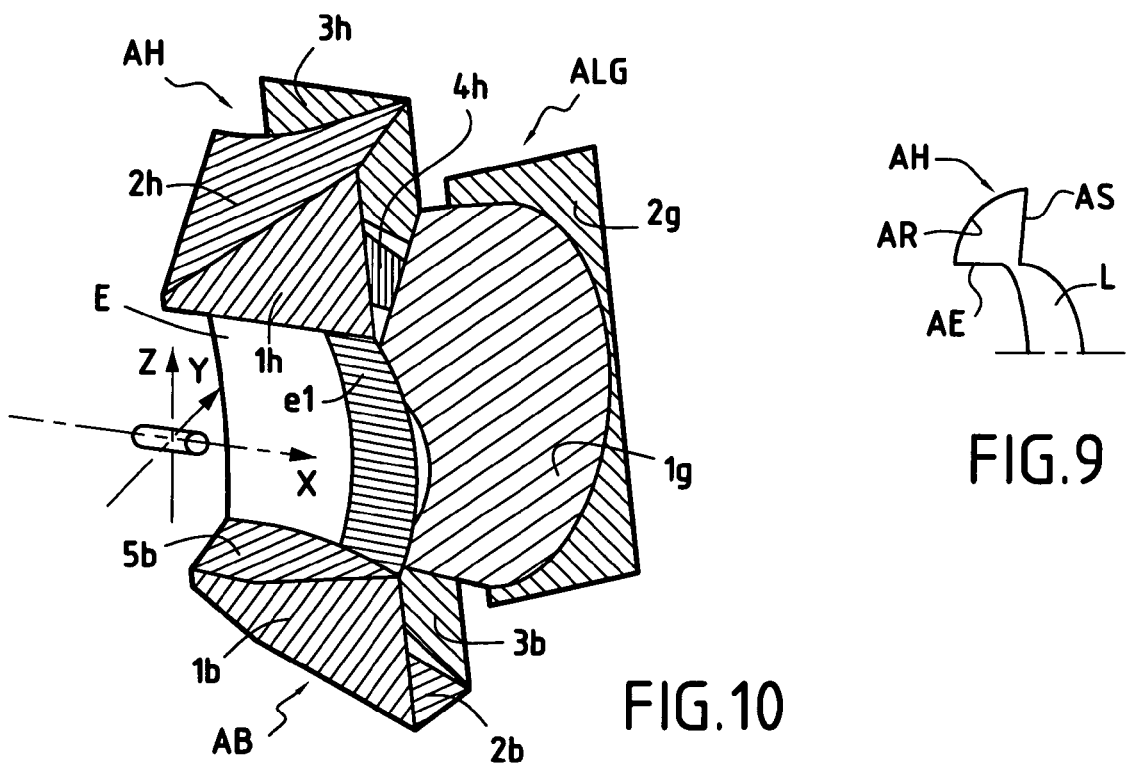
FIG.9
FIG.10
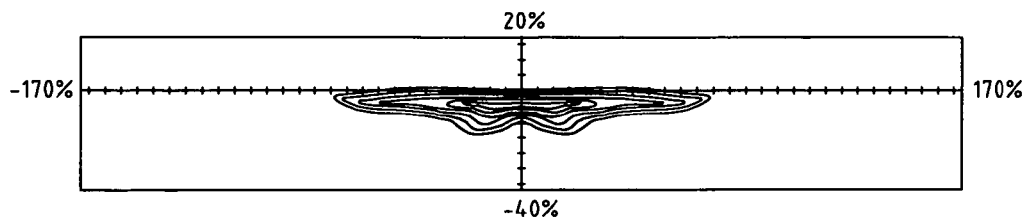
FIG.11

COMPACT HEADLIGHT FOR A MOTOR VEHICLE

FIELD OF THE INVENTION

The invention relates to a compact headlight for a motor vehicle, giving a light beam with cut-off, having an optical axis and comprising a light source having a substantially horizontal axis extending substantially perpendicular to the optical axis of the headlight.

BACKGROUND OF THE INVENTION

The invention concerns more particularly, but not exclusively, a light of the fog type.

A light is known equipped with a reflector whose surface is determined so as to provide the beam with cut-off, that is to say the light rays of the reflected beam are situated essentially below a cut-off line, which may be horizontal or which may be formed by a broken line in the case of a dipped headlight. The light source used is fairly powerful so that the portion of the light emitted towards the rear in the direction of the reflector suffices to produce the required light beam. To prevent the light emitted forwards by the light source creating dazzling by direct observation, a cover is generally provided situated in front of the light source. Part of the light flux is therefore not used for the lighting beam, which does not prevent satisfying the photometry conditions for the light beam in the case of a high-power source.

In its not yet published French patent application No. 04 11 785, filed on 4 Nov. 2004, the applicant discloses a headlight for a motor vehicle of the type giving a beam with cut-off. In this headlight, the cover normally situated in front of the light source is omitted and replaced by a lens which is determined so as to produce the beam with cut-off. The elimination of the cover allows a more complete use of the flux of the source and correspondingly a reduction in the power of the latter.

The reduction in the power of the source in French patent application No. 04 11 785 results in an alleviation of the thermal stresses in the headlight, which makes possible a greater compactness in terms of depth, in particular because of a lesser distance between the source and the lens closing off the headlight.

Although the headlight described in French patent application No. 04 11 785 affords a substantial improvement in the way of lesser bulk, it remains desirable to propose other solutions allowing greater compactness still, in particular in order to facilitate the integration of new functions in headlights such as for example the so-called DRL ("Day Running Light") daytime lighting faction.

SUMMARY OF THE INVENTION

The object of the present invention is essentially providing a headlight of the type defined above which makes it possible to obtain a light beam with satisfactory cut-off and which is highly compact.

The compact headlight according to the invention, for a motor vehicle, giving a light beam with cut-off, in particular of the fog type, having an optical axis and comprising a light source having a substantially horizontal axis extending substantially perpendicular to the optical axis of the headlight.

In accordance with the invention, the headlight does not comprise a reflector, and has, in front of the light source, a lens determined so as to give a light beam with cut-off.

According to another characteristic, the lens is determined so that the extreme incident rays emitted by the source are refracted, on emerging from the lens, substantially parallel to the optical axis, whilst the other incident light rays emitted by the source are refracted with a downward inclination with respect to the optical axis.

The headlight according to the invention, briefly described above, affords embodiments which make it possible to fully satisfy the normative rules applying in this technical field. Thus the headlight according to the invention gives rise to embodiments in accordance with the current European standard R19-2 and the future standard R19-3, and the corresponding standards apply in the territory of the United States of America.

For example, conformity with R19-2 has been obtained with a simple H8 lamp. An H7 or H11 lamp is generally suitable in other cases.

According to a particular embodiment, the lens comprises at least one top and/or bottom wing participating in the formation of the light beam with cut-off and which is substantially horizontal and perpendicular to the optical axis. In addition, the lens can also have at least one left and/or right lateral wing participating in the formation of the light beam with cut-off and which is substantially vertical and perpendicular to the optical axis.

Preferably, the lens comprises an entry face situated close to the source. Advantageously, the entry face of the lens is of the toroidal, spherical or cylindrical type.

According to a particular embodiment, the light source is a lamp with axial filament and is disposed substantially transversely. For example, but not exclusively, the light source is a filament lamp of the H7, H8 or H11 type.

According to another particular embodiment, the light source is of the light emitting diode type. The light source can be formed by several light emitting diodes grouped for example in a multichip module.

According to another particularly compact embodiment of the headlight according to the invention, the light source and the lens are formed in a single unit, the light source being formed from one or more light emitting diodes and the lens being formed from a heat-resistant synthetic material which is moulded onto at least one luminous surface of the source.

So as to reduce the thickness of the lens, in certain embodiments, it can be of the Fresnel lens type and comprise fresnelised parts at the exit.

Other aspects and advantages of the present invention will emerge more clearly from a reading of the following description of particular embodiments, this description being given by way of non-limiting example and made with reference to the accompanying drawings, in which:

BRIEF DESCRIPTION OF THE DRAWINGS

FIG. 8 illustrates the isolux curves obtained with the headlight of FIGS. 1 and 2 equipped with a filament lamp;

FIG. 9 is a half-view in section showing schematically the general structure of a top wing supplementing the lens in its top part;

FIG. 10 is a half-view in perspective showing optical surfaces obtained for a lens according to the invention incorporated in a headlight equipped with a light source formed from several light emitting diodes; and FIG. 11 illustrates the isolux curves obtained with a headlight according to the invention equipped with a source of the light emitting diode type.

DESCRIPTION OF THE PREFERRED EMBODIMENTS

A description is now given of a first embodiment of the invention in the form of a fog light 1 equipped with a filament lamp.

Figure 1:
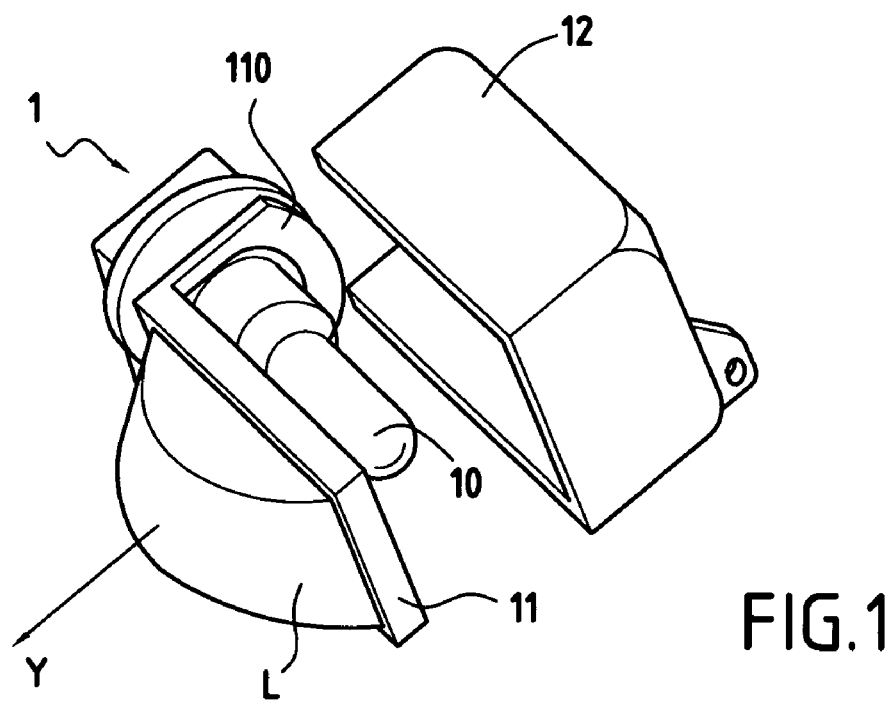
FIG. 1 is a general view in perspective showing a headlight according to the invention, with the housing removed, equipped with a filament lamp.

As shown in FIG. 1, the light 1 does not have a reflector and comprises essential a filament lamp 10, a lens L, a lens/lamp support 11 and a housing 12.

In this first embodiment of the invention, the lamp 10 is a lamp with axial filament, for example a lamp of the H7, H8 or H11 type.

In accordance with the invention, the lens L is determined so as the light 1 provides a light beam with cut-off. Construction principles that can be used for the definition of the optical surface of the lens L according to the invention are described in the remainder of the description In this embodiment, the support 11 consists of a monobloc piece which is moulded onto the lens L. The support 11 comprises a section 110 in which there is provided an opening intended for mounting the lamp 10.

As is clear in FIG. 1, the lamp 10 is mounted transversely in the light 1 so that the axis of the filament of the lamp 10 is substantially horizontal and perpendicular to the optical axis Y-Y of the light 1. Preferably, the lamp 10 is mounted so as to allow an optical adjustment for position of the lamp 10 with respect to the lens L.

In other embodiments of the invention, the lamp 10 will be able to be mounted with the filament axis extending obliquely to the optical axis of the light 1, that is to say, so as to have an angle different from 90° between the two axes.

The material of the housing 12 must be chosen so as to be able to absorb the light rays emitted by the rear part of the filament of the lamp 10, that is to say, the part of the filament of the lamp 10 that is not facing the entry face of the lens L.

This property of absorption of the housing 12 prevents rays emitted by the rear part of the filament from being reflected towards the lens L and interfering with the optical distribution of the light beam with cut-off emitted by the light 1.

In addition, the housing fulfils a function of optical isolation of the lamp 10 with respect to the external environment, in particular when the light 1 is integrated in an optical assembly fulfilling other lighting/signalling functions.

Preferably, a mechanism (not shown) intended for the adjustment of the angle of elevation of the optical module should be provided and housed also in the housing 12. Such a mechanism known to persons skilled in the art, allows an adjustment of the light beam with cut-off with respect to the horizon.

Figure 2:
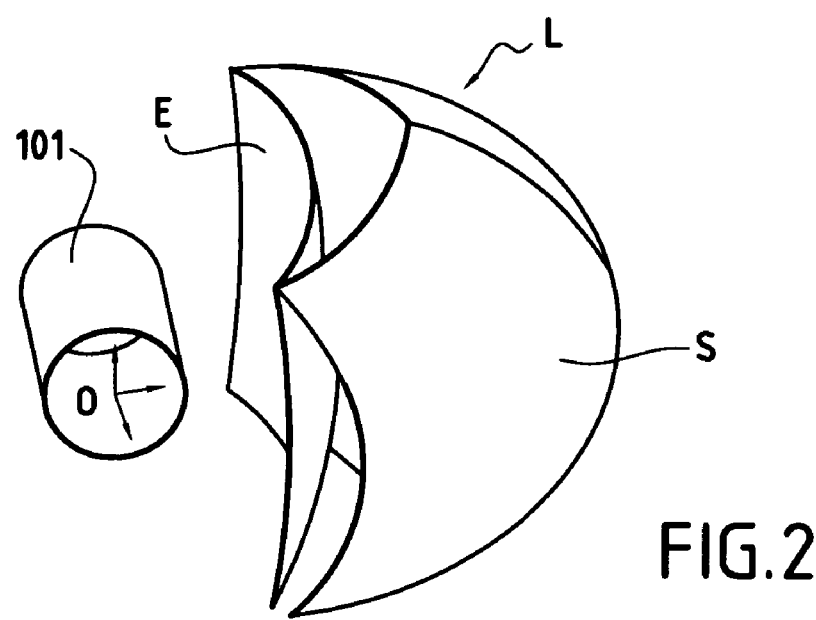
FIG. 2 is a view in perspective showing in modelled form an optical system according to the invention composed of a light source and a dioptric lens.
Figure 3:
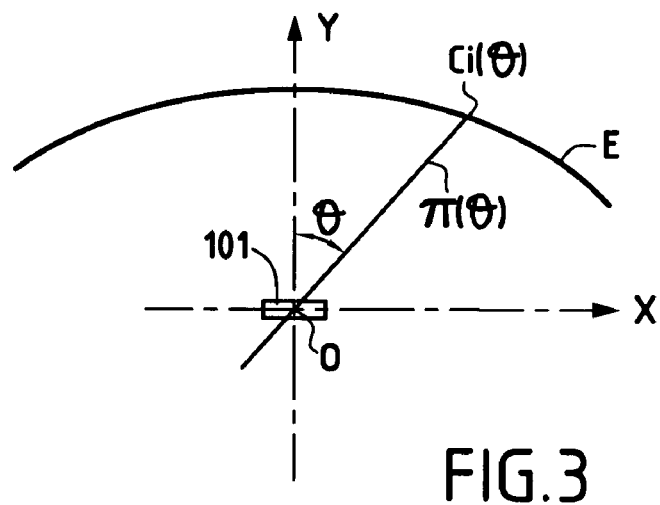
FIG. 3 is a schematic plan view of the lens entry face and vertical planes passing through the centre of the source and forming different angles with the optical axis.
Figure 4:
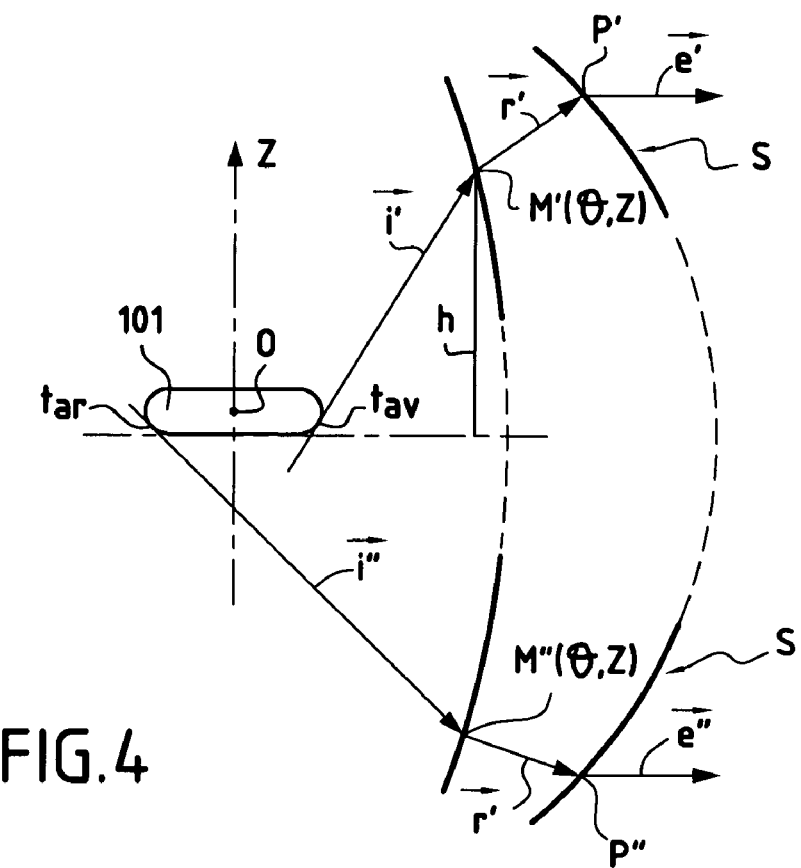
FIG. 4 is a diagram of the projection of the light source onto an oblique incidence plane, with extreme incident rays on the lens entry face.

As shown in FIG. 2, in this first embodiment, the lens L is of the meniscus type. The lens L is represented in the FIG. 2 by its optical entry E and exit S surfaces.

The filament of the lamp 10 is, as known in this technical field, modelled by a cylinder 101. This cylinder 101 approximates the general shape of the envelope of the filament, which generally consists of a helically wound wire.

In accordance with the invention, the optical entry surface E may have various possible surfaces, e.g., a toroidal surface, a cylindrical surface and a spherical surface. Once the entry surface E is chosen, the optical exit surface S must be determined so as to obtain the required light beam with cut-off.

In this first embodiment, the optical entry surface E is chosen as being a toroidal surface biconcave on the filament side. Such an entry surface is here particularly advantageous because of the high solid angle and the small angles of incidence of the light rays illuminating the surface E.

In accordance with the invention, there is chosen, for the optical exit surface S, a two-dimensional (2D) generating curve $G_h$, which must comply with the following constraints:

1) For a point light source situated at the origin O of the spatial reference frame and the light rays issuing from this source and situated in a horizontal plane, all the light rays emerging from the lens L at $G_h$ do not have intersections with each other except at $G_h$ (the emerging rays being half straight lines, one end of which is situated on $G_h$). The construction is here 2D and it is considered that the incident rays are diverted vertically neither by the entry face E nor by the exit face S. The vertical non-deviation of the incident rays by the exit face S along $G_h$ is a starting hypothesis which must be verified a posteriori.

2) The tangent to $G_h$ at its point of intersection with the optical axis is perpendicular to the optical axis.

The construction of the lens L according to the invention is disclosed below with reference to FIGS. 3 to 8.

In a first method, the principle of the construction of the lens L is based essentially on a projection of the filament 101 in a family of vertical planes $\pi$ containing the vertical axis Z-Z through the centre O of the filament and on the definition of these planes $\pi$ of the extreme incident rays to be considered.

The extreme incident rays emitted by the filament 101 must emerge from the lens L (exit face S) whilst being contained in a horizontal plane. The other incident rays emitted by the filament 101 are refracted with a downward inclination with respect to the optical axis Y.

A vertical plane $\pi(\theta)$ which passes through the centre O of the filament 101 and which forms an angle $\theta$ with the optical axis Y-Y is therefore considered. The angle $\theta$ can vary from 0 to a value corresponding to one of the vertical edges of the entry face E.

The vertical intersection of the plane $\pi(\theta)$ with the entry face E is designated $C_i(\theta)$. A point of altitude z situated on $C_i(\theta)$ is also designated $M(\theta,z)$.

For each point $M(\theta,z)$, an incident ray $\vec{i}$ is constructed at this point, issuing from the projection of the filament 101 in the plane $\pi(\theta)$.

The incident ray $\vec{i}$ is contained in the plane $\pi(\theta)$. The ray $\vec{r}$ issuing from the incident rays $\vec{i}$ and refracted by the entry face E is then constructed, and it is written that the ray $\vec{e}$ issuing from the ray $\vec{r}$ and refracted by the exit face S of the lens L is a horizontal ray.

The extreme incident rays $\vec{i}\,'$ and $\vec{i}\,''$ to be considered in the plane $\pi(\theta)$ are those tangent respectively to the rear and front extreme contours of the orthogonal projection of the filament 101 in the plane $\pi(\theta)$. The orthogonal projection of the filament 101 in the plane $\pi(\theta)$ has ends in an arc of an ellipse. The points of tangency on the front and rear end contours of the orthogonal projection of the filament 101 are marked $t_{ar}$ and $t_{av}$ in FIG. 4.

In a second construction method, the limit rays are determined in space. This method is essential in a case where the light emitter is immersed in a medium with a different index from the propagation medium for the light as far as the entry face E of the lens.

This is because, in such a case, it is impossible to project the primary lens which constitutes the exit diopter for the light out of the source. Some LEDs whose chips are coated with a resin of significant thickness are of this type.

When the light emitter can be considered to be placed in air, for example a filament approximated by a cylinder, this second method results in surfaces practically identical to those obtained by the first method, which is then preferred to it.

In this second method, the rays $\vec{i}'$ and $\vec{i}''$ are defined as being the rays refracted by the exit diopter of the source, corresponding respectively to rays tangent to the emitter issuing from a point of the latter such that the distance from this point to the point of impact M' or M'' on the lens is minimum ($\vec{i}'$) or maximum ($\vec{i}''$) in projection on the transverse axis x.

In the absence of a diopter, it is the rays $\vec{i}'$ and $\vec{i}''$ which are directly tangent to the light emitter.

Figure 5:
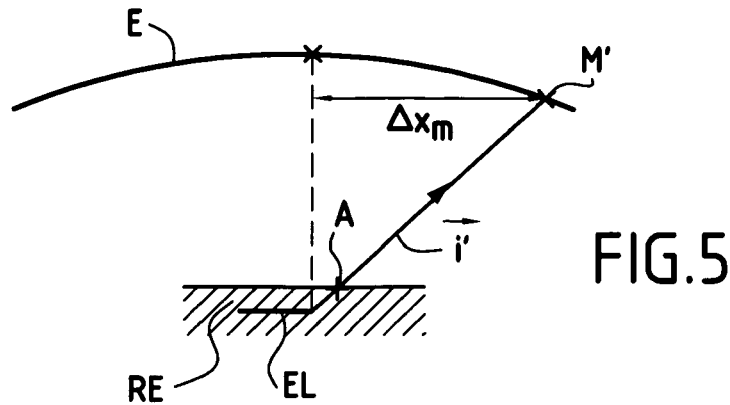
FIGS. 5 and 6 show a choice of rays in a particular construction method applied to a flat source immersed in a resin.
Figure 6:
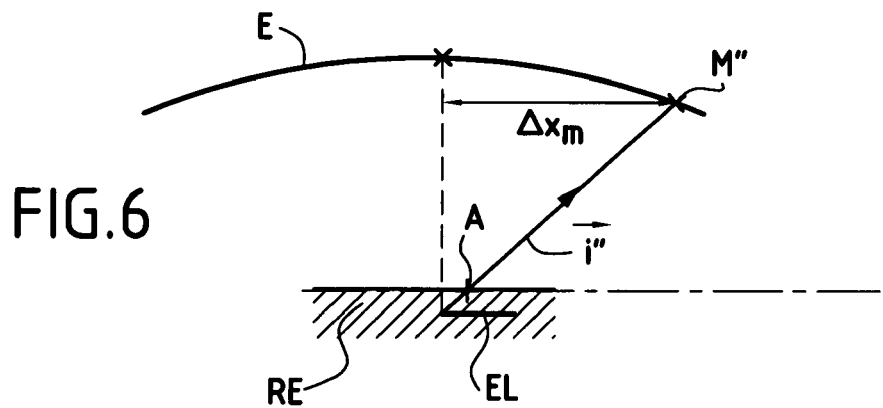

Relating to the second method disclosed above, FIGS. 5 and 6 show in plan view the case of a flat source, for example an LED chip, immersed in a resin and having a flat exit face, perpendicular to an optical axis. The references EL and RE designate respectively the light emitter and the resin. In this particular case, the intermediate variable A, representing the point of emergence of the light ray on the flat exit face, can be determined analytically by resolving a $4^{th}$ th degree equation.

Figure 7:
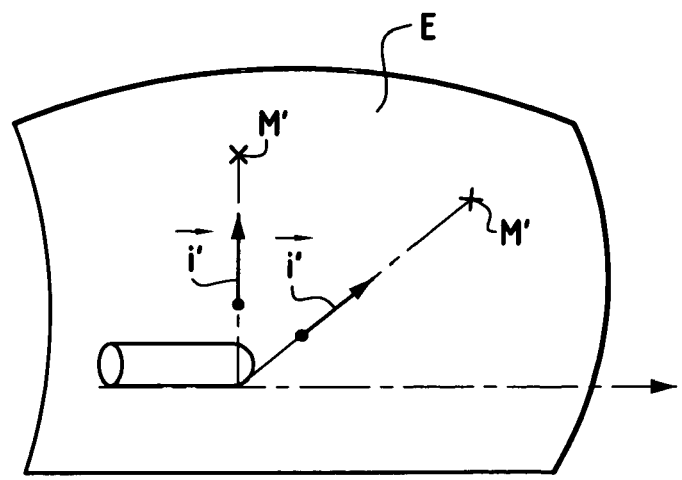
FIG. 7 shows a choice of rays in a particular construction method applied to the case of a filament.

Still relating to the second method, FIG. 7 shows the case of a filament. In this case, the ray $\vec{i}'$ is tangent to the cylinder modelling the filament at a point belonging to the circle situated at the end of the filament or to the cross section of the filament through a plane $x=M'_x$.

The writing of the horizontal condition of the emerging rays $\vec{e}$ results in a partial derivative equation of the exit surface S sought. This partial derivative equation can be resolved by numerical methods knowing that two edges are known and constitute conditions at the limits allowing calculation.

The two known edges allowing the resolution of the partial derivative equation of the exit surface S result from the "arbitrary" choice of the generator $G_h$ and of the second constraint 2) (indicated above) imposed on $G_h$.

This is because, because of constraint 2), the emerging rays $\vec{e}$ corresponding in the plane $\pi(\theta=0)$ to the incident rays $\vec{i}$ tangent to the projection of the filament 101 are parallel to the axis Y-Y, so that the cross section of the exit face S through the vertical plane $\pi(\theta=0)$ can be obtained by a two-dimensional (2D) optical calculation. The projection of the filament 101 in the plane $\pi(\theta=0)$ is then a circle whose radius is that of the filament 101.

A differential equation is obtained which can be resolved by a numerical method.

For example, satisfactory results have been obtained by assimilating the tangent to the chord and making a progressive calculation from the point of coordinate z=0 for which the thickness at the centre of the lens is a known construction parameter.

A description is now given below of an example of resolution by the finite differences method of the partial derivative equation of the exit surface S sought. In this example, use is made of a progressive calculation which is made "vertical line by vertical line", by moving the starting point of each line along a discretisation of the generatrix $G_h$. One advantage of the above approach, indicated by way of example, is that each point on the exit surface S can be calculated analytically because two adjacent points are known.

The following notations are used:

P, any point on the vertical line in question of the exit surface S,

Po, $\overline{P}$, points on the surface S adjacent to the point P and assumed to be known, $\vec{r}$, the diffracted ray issuing from the incident ray $\vec{i}$ impacting the entry surface E, $\vec{e}$, the ray emerging at point P on the exit surface S, $\vec{N}$, the normal to the exit surface S at the point P, n, refractive index of the material of the lens L, and μ, intermediate unknown sought.

The following equations can be written:

$$P=M+\mu \cdot \vec{r},$$

$$\vec{N} \text{ colinear to } n\vec{r}-\vec{e}, \text{ and}$$

$$\vec{N} \approx \overrightarrow{PoP} \Lambda \overrightarrow{PoP}.$$

From the above equations, knowing that $\vec{e}$ is normed and horizontal, a second degree equation in μ is obtained of the form $A\mu^2+B\mu+C=0$, where $$A=V2_z^2-n^2k_2^2-n^2k_4^2$$

$$B=2(V1_zV2_z-n^2k_1k_2-n^2k_3k_4)$$

$$C=V1_z^2-n^2k_1^2-n^2k_3^2.$$

with, $$k_1=r_xV1_z-r_zV1_x$$

$$k_2=r_xV2_z-r_zV2_x$$

$$k_3=r_yV1_z-r_zV1_y$$

$$k_4=r_yV2_z-r_zV2_y$$

and, $$\overrightarrow{V1}=\overrightarrow{PoM}\Lambda\overrightarrow{PM}$$

$$\overrightarrow{V2}=(\vec{r}\Lambda\overrightarrow{PPoP})$$

The unknown μ can be calculated for each of the points P in question, which therefore allows the construction of the exit surface S.

FIG. 8 illustrates the network of isolux curves obtained with an H11 lamp, a lens L measuring 48×34 mm² in front view and a depth dimension of the lens/lamp system of approximately 42 mm.

In accordance with the invention, in so far as the available volume so allows, the lens L can be supplemented by wings intended to optimise the optical performance of the headlight. Thus it is possible to supplement the lens L with top, bottom and/or lateral wings.

As shown in section in FIG. 9 schematically, the top wing AH comprises an entry surface AE, a reflective surface AR and an exit surface AS. Preferably, in order to arrive at small dimensions, the entry surface AE is chosen so as to reflect the rays towards the rear as much as possible. A surface AE of the planar or conical type, roughly horizontal and extending from the edge of the lens L as far as the top of the filament 101, is an acceptable compromise for certain applications of the invention.

The reflective surface AR can be defined so as to function in total, partial or specular reflection. The choice of the type of reflection of the surface AR is related to the choice of the entry surface AE. The total reflection offers the advantage of good efficiency and simplicity of implementation, in particular compared with specular reflection, which requires the deposition of a reflective coating.

For the construction of the reflective surface AR and the exit surface AS, a person skilled in the art can advantageously use calculation principles similar to those disclosed above by way of example for the construction of the lens L, by adapting the choice of the extreme rays.

FIG. 10 shows a half-view in perspective of the active optical surfaces obtained for a lens L2 according to the invention incorporated in a headlight equipped with a light source 6 with several light emitting diodes grouped together in a multichip module (hereinafter referred to as a "multi-LED" source).

It should be noted here that the principles of construction of the lens disclosed above for a filament source apply also to the case of a multi-LED source or a source comprising a single light emitting diode (LED).

Thus, for example, in the case of a multi-LED source having a flat rectangular shape, the extreme light rays to be considered in the constructions are those issuing from suitable corners of the rectangular projection of the source rather than those tangent to the elliptical projection of the end of a cylinder as with the filament 101.

In FIG. 10, the lens L2 is observed on the same side as the light source 6. The part of the lens L2 that is not shown in FIG. 10 is similar to that shown with respect to the cutting plane of the half-view.

Optical surfaces of the top AH, bottom AB and left-hand side ALG wings can be seen in FIG. 10.

Optical surfaces 1h, 2h, 3h and 4h are visible in FIG. 10 for the top wing AH. Optical surfaces 1b, 2b, 3b and 5b are visible for the bottom wing AB. The left-hand side wing ALG is represented by the optical surfaces 1g and 2g.

Concerning the lateral wings, in this embodiment, the surface 1g functions in total reflection and the exit surface 2g is a prism.

As also shown in FIG. 10, the toric entry face E of the lens L is extended by an additional toric entry face e1 associated with the left hand lateral wing ALG. Naturally another additional toric entry face e2 (not shown) is associated with the right hand lateral wing ALD (not shown).

The additional entry faces e1 and e2 advantageously make it possible to obtain a smooth entry phase. For the construction of these entry faces e1 and e2, a person skilled in the art will have to bear in mind that the entry surfaces associated with the lateral wings must meet a minimum condition which is that the light rays that they refract must have no intersection with those refracted by an adjacent entry face. In addition, continuity of the surfaces is essential in order to avoid the production of a family of uncontrolled light rays.

FIG. 11 illustrates a network of isolux curves obtained with the lens L2 of FIG. 6 and a multi-LED source delivering 99 lumens.

The use of a source of the above type emitting in a half space has the advantage of offering high efficiency in terms of light flux, compared with a filament source where half the light flux is lost.

Thus the tests carried out by the inventive entity have shown the possibility of obtaining light flux yields that are greater than 70%.

Naturally the present invention is not limited to the details of the embodiments described here by way of example but on the contrary extends to any modifications within the capability of a person skilled in the art without departing from the scope of the invention.

Thus, for example, it should be noted that, according to the embodiments and applications of the invention, it is possible to segment the lens and wings into blocks like a Fresnel lens in order to reduce their thickness, that is to say to "fresnelise" these optical components.

Moreover, in certain embodiments of the invention, the light source and lens can be formed in a single unit. The light source then typically comprises several light emitting diode chips and the lenses formed from a heat-resistant synthetic material which is moulded onto the light surfaces of the chips.

What is claimed is:

1. A compact headlight for a motor vehicle, giving a light beam with cut-off, having an optical axis and comprising:
   (a) a housing having a substantially non-reflective interior surface and a front opening;
   (b) a light source disposed in the housing, the light source having an axial filament disposed along a substantially horizontal axis extending substantially transversely to the optical axis of the headlight; and
   (c) a lens coupled to the housing and spanning substantially across the front opening of the housing, wherein the lens produces a light beam with cut-off comprising extreme incident light rays emitted by the light source tangent respectively to the rear and to the front extreme contours of the orthogonal projection of the light source filament in a vertical plane passing through the center of the filament and forming an angle with the optical axis, the extreme incidental rays being contained in the vertical plane and being refracted, at the exit from the lens, substantially parallel to the optical axis, and wherein the housing does not comprise a reflector for redirecting light rays emitted by the light source toward the lens.

2. The headlight according to claim 1, wherein extreme incident rays emitted by the light source are refracted, at the exit from the lens, substantially parallel to the optical axis, whilst other incident light rays emitted by the source are refracted with a downward inclination with respect to the optical axis.

3. The headlight according to claim 2, wherein the light source is a lamp with an axial filament disposed substantially transversely to the optical axis of the headlight.

4. The headlight according to claim 3, wherein the light source is a filament lamp of the H7, H8 or H11 type.

5. The headlight according to claim 1, wherein the lens comprises at least one top and/or bottom wing participating in the formation of the light beam with cut-off, the wing being substantially horizontal and perpendicular to the optical axis.

6. The headlight according to claim 1, wherein the lens comprises at last one left-hand and/or right-hand lateral wing participating in the formation of the light beam with cut-off, the wing being substantially vertical and perpendicular to the optical axis.

7. The headlight according to claim 1, wherein the lens comprises an entry face situated close to the light source.

8. The headlight according to claim 7, wherein the entry face is of the toric, spherical or cylindrical type.

9. The headlight according to claim 1, wherein the lens is of the Fresnel lens type and comprises so-called fresnelised parts at the exit.

10. The headlight according to claim 1, wherein at least a portion of the housing is disposed to the rear of the light source and the non-reflective interior surface of the housing absorbs light rays emitted from the light source.

11. The headlight according to claim 1, wherein the lens is a meniscus type.

12. The headlight according to claim 11, wherein the lens comprises an entry face having a torodial surface.

13. A compact headlight for a motor vehicle, giving a light beam with cut-off, having an optical axis and comprising:
   (a) a housing having a substantially non-reflective interior surface and a front opening;
   (b) a light source disposed in the housing, the light source comprises a light emitting diode having a substantially flat exit face disposed substantially perpendicular to the optical axis of the headlight and having a chip being immersed in a first medium having a refraction index, wherein a first and a second extreme incident rays are defined as being the rays refracted by the first medium, tangent to the chip of the light emitting diode and issuing from a point of the chip such that the distance from the point to respectively a first point of impact and a second point of impact on the lens is minimum or maximum in projection on a transverse axis, and wherein said extreme incident rays are refracted, at the exit from the lens, substantially parallel to the optical axis, while the other incident light rays emitted by the source are refracted with a downward inclination with respect to the optical axis; and
   (c) a lens coupled to the housing and spanning substantially across the front opening of the housing, wherein the lens comprises an entry face which receives the light rays emitted by the light emitting diode and the lens produces a light beam with cut-off from light rays emitted by the light source, and wherein the refraction index of the first medium is different from the refraction index of a propagation medium for the light rays between the first medium and the entry face of the lens and wherein the housing does not comprise a reflector for redirecting light rays emitted by the light source toward the lens.

14. The headlight according to claim 13, wherein the light source comprises a plurality of light emitting diodes.

15. The headlight according to claim 14, wherein the lens comprises at least one top and/or bottom wing participating in the formation of the light beam with cut-off, the wing being substantially horizontal and perpendicular to the optical axis.

16. The headlight according to claim 14, wherein the lens comprises at least one left-hand and/or right-hand lateral wing participating in the formation of the light beam with cut-off, the wing being substantially vertical and perpendicular to the optical axis.

17. The headlight according to claim 13, wherein the light source and the lens are formed in a single unit, the light source being formed from one or more light emitting diodes and the lens being formed from a heat-resistant synthetic material which is moulded at least onto one luminous surface of the light source.

* * * * *